US012154007B2

United States Patent
Huang et al.

(10) Patent No.: US 12,154,007 B2
(45) Date of Patent: Nov. 26, 2024

(54) FIBER SENSING ON ROADSIDE APPLICATIONS

(71) Applicant: NEC Laboratories America, Inc., Princeton, NJ (US)

(72) Inventors: Ming-Fang Huang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 835 days.

(21) Appl. No.: 16/229,676

(22) Filed: Dec. 21, 2018

(65) Prior Publication Data

US 2019/0236477 A1 Aug. 1, 2019

Related U.S. Application Data

(60) Provisional application No. 62/622,217, filed on Jan. 26, 2018.

(51) Int. Cl.
| | |
|---|---|
| *G01H 9/00* | (2006.01) |
| *G01M 3/38* | (2006.01) |
| *G06N 20/00* | (2019.01) |
| *G08G 1/01* | (2006.01) |
| *H04B 10/25* | (2013.01) |

(52) U.S. Cl.
CPC ............ *G06N 20/00* (2019.01); *G01H 9/004* (2013.01); *G01M 3/38* (2013.01); *G08G 1/0116* (2013.01); *H04B 10/25* (2013.01)

(58) Field of Classification Search
None
See application file for complete search history.

(56) References Cited

U.S. PATENT DOCUMENTS

2011/0292763 A1* 12/2011 Coates ................... G01V 1/226
367/25
2020/0191613 A1* 6/2020 Englund ............ G01D 5/35361

FOREIGN PATENT DOCUMENTS

JP          H1088998 A  *  4/1998

OTHER PUBLICATIONS

Naqa et al., "What is Machine Learning", 2015, Springer, Machine Learning in Radiation Oncology: Theory and Applications, pp. 3-11. (Year: 2015).*
Abellan et al., "Rockfall Monitoring by Terrestrial Laser Scanning—Case Study of the Basaltic Rock Face at Castellfollit de la Roca", Nat. Hazards Earth Syst. Sci., Mar. 2011, pp. 829-841.
Andersson et al., "Smoke Detection in Buildings with High Ceilings", SP Swedish National Testing and Research, Brandforsk Project No. 628-011, 2003, 120 pages.
(Continued)

*Primary Examiner* — Sung H Pak
(74) *Attorney, Agent, or Firm* — Joseph Kolodka

(57) ABSTRACT

A fiber-based roadside condition sensing system is provided. The system includes a fiber optic cable arranged in various roadside locations for Distributed Vibration Sensing (DVS) and Distributed Acoustic Sensing (DAS) at the various roadside locations. The system further includes a machine-learning-based analyzer for selectively providing any of an early warning and a prevention of various detected conditions responsive to a machine-learning-based analysis of results from the DVS and the DAS.

10 Claims, 5 Drawing Sheets

(56) References Cited

OTHER PUBLICATIONS

Evarts, "Structure Fires in Warehouses", National Fire Protection Association, Fire Analysis and Research Division National Fire Protection Association, Sep. 2011, 27 pages.
Fraser-Mitchel et al., "Sprinkler Installation Trends and Fire Statistics for Warehouse Buildings", Building Research Establishment Ltd., DCLG Final Research Report BD 2537 (D2V1) 226839, Mar. 2006, 51 pages.
Grosshandler, "A Review of Measurements and Candidate Signatures for Early Fire Detection", Building and Fire Research Laboratory National Institute of Standards and Technology, Jan. 1995, 36 pages.
Kemeny et al., "Digital Imaging for Rock Mass Characterization", Dept. Mining and Geological Engineering, Nov. 2016, 11 pages.
McHugh et al., "Simplified Hyperspectral Imaging for Improved Geologic Mapping of Mine Slopes", National Institute for Occupational Safety and Health, In Proceedings of the Third International Conference on Intelligent Processing and Manufacturing of Materials, Aug. 2011, 10 pages.
Partsinevelos et al., Integration of Seismic and Image Data Processing for Rockfall Monitoring and Early Warning Along Transportation Networks, Springer, Nat. Hazards, Jul. 2016, pp. S133-S153.
Peacock, "An Analysis of Security Issues in Building Automation Systems", Proceedings of the 12th Australian Information Security Management Conference, Dec. 2014, 6 pages.
Schneider Electric, T.A.C., "Integration: The Future of Commercial Office Building Security", 2006, 12 pages.
Vorster et al., "Using Radar Technology to Assess the Effect of Dewatering on Slope Stability", The Southern African Institute of Mining and Metallurgy, Slope Stability 2015, Oct. 2015, pp. 1225-138.

\* cited by examiner

FIBER SENSING ON ROADSIDE APPLICATIONS

RELATED APPLICATION INFORMATION

This application claims priority to U.S. Prov. Pat App. Ser. No. 62/622,217, filed on Jan. 26, 2018, incorporated herein by reference herein its entirety.

BACKGROUND

Technical Field

The present invention relates to transportation and more particularly to fiber sensing on roadside applications.

Description of the Related Art

Rocks falling onto roads (e.g., highway, railway lines) raise a significant issue for human safety and environmental disaster. Along the highway, falls involving rocks can cause traffic interruptions and serious injuries to drivers and passengers. Current rock fall protective measure systems typically include slide fences or netting which are mainly deployed by operators to minimize the impact of detrimental effects. Most approaches use active sensors or cameras as primary equipment for event detection. These systems require personnel to investigate events which cause risk to workers and slowing the analyzing efficiency. In addition, these systems cannot provide real time, long term and continuous monitoring. Hence, there is a need for an improved approach to detecting detrimental roadside conditions.

SUMMARY

According to an aspect of the present invention, a fiber-based roadside condition sensing system is provided. The system includes a fiber optic cable arranged in various roadside locations for Distributed Vibration Sensing (DVS) and Distributed Acoustic Sensing (DAS) at the various roadside locations. The system further includes a machine-learning-based analyzer for selectively providing any of an early warning and a prevention of various detected conditions responsive to a machine-learning-based analysis of results from the DVS and the DAS.

According to another aspect of the present invention, a computer-implemented method is provided for fiber-based roadside condition sensing. The method includes arranging a fiber optic cable in various roadside locations for Distributed Vibration Sensing (DVS) and Distributed Acoustic Sensing (DAS) at the various roadside locations. The method further includes selectively providing, by a machine-learning-based analyzer, any of an early warning and a prevention of various detected conditions responsive to a machine-learning-based analysis of results from the DVS and the DAS.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to fiber sensing on roadside applications.

In an embodiment, distributed fiber sensing is implemented along roadside fences for event (e.g., rock falling, mudslides, road deterioration, etc.) detection. In an embodiment, the present invention advantageously integrates fiber sensing, machine learning (artificial intelligence), and communication technologies to provide a solution in the form of an event prevention and early warning system.

In an embodiment, optical fiber is used to realize distributed fiber sensing which includes Distributed Vibration Sensing (DVS) and Distributed Acoustic Sensing (DAS) in real time, continuously and remotely. Acoustic disturbance on fiber generates microscopic elongation or compression of the fiber (strain), which causes a change in the phase relation. The optical fiber laid on fences will transmit long-term sensing data and communication signals simultaneously. In this way, the integrating of artificial intelligence and early detection (e.g., rock falling, mudslide, road deterioration, etc.) for disaster prevention can be achieved.

In an embodiment, artificial intelligence technology can be used for judgement of event severity to activate display signs and send emergency information to base stations.

Figure 1:
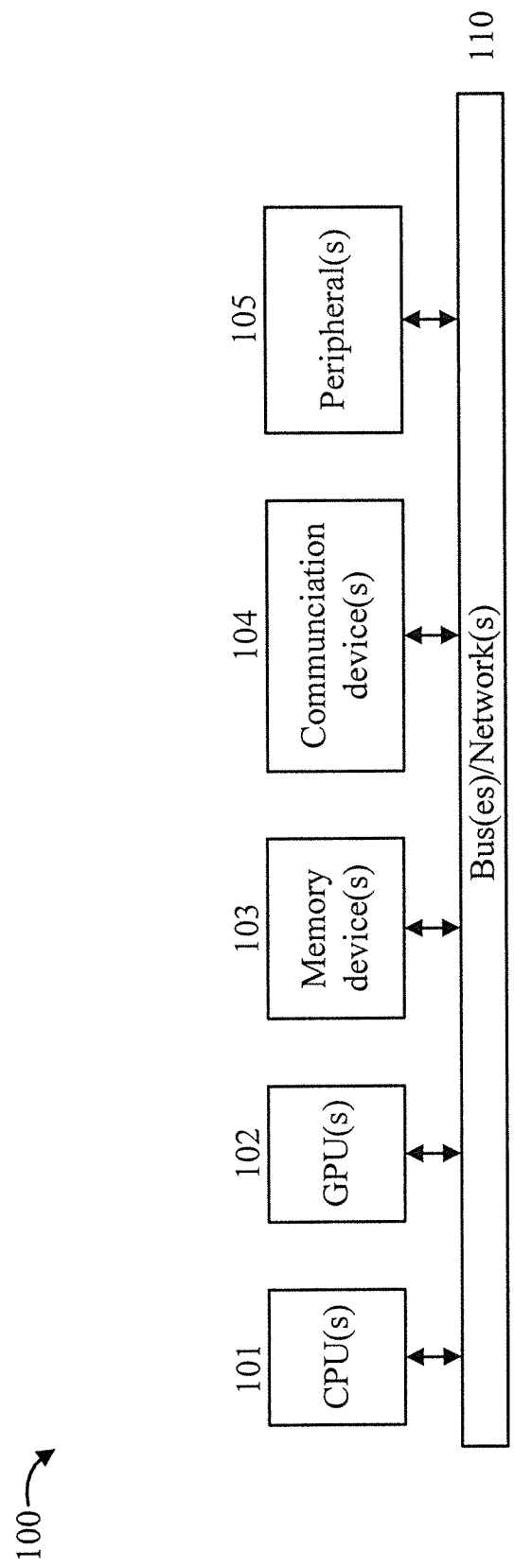
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used. These and other variations of the processing system 100 are readily contemplated by one of ordinary skill in the art given the teachings of the present invention provided herein.

Moreover, it is to be appreciated that various figures as described above with respect to various elements and steps relating to the present invention that may be implemented, in whole or in part, by one or more of the elements of system 100. Moreover, one or more elements of system 100 may be used to control one or more elements of the various architectures described herein.

In an embodiment, the present invention advantageously integrates distributed fiber sensing (in the forms of, e.g., DVS and DAS) to provide a sensing and access network through optical fiber laid on fences along highway, railway lines and tunnels. The present invention can provide very promising performance for event detection in real time with early warning systems. Additionally, event detection can be done remotely to reduce the risk to workers.

Figure 2:
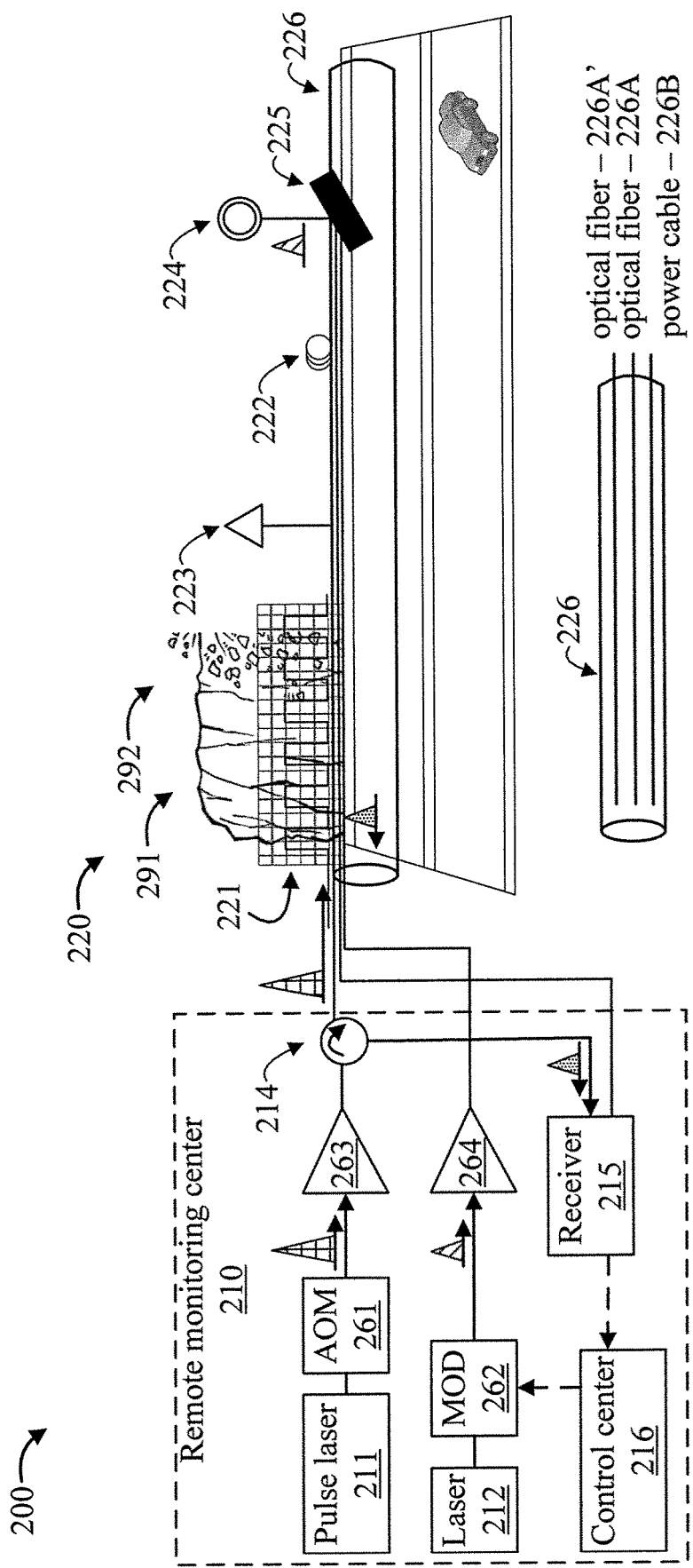
FIG. 2 is a block diagram showing an exemplary event detection system that integrates distributed fiber sensing system and communication, in accordance with an embodiment of the present invention.

FIG. 2 is a block diagram showing an exemplary event detection system 200 that integrates distributed fiber sensing system and communication, in accordance with an embodiment of the present invention. Events that can be detected including, but are not limited to, for example, rock falling, mudslide, and so forth.

The even detection system 200 can be considered to include the following two portions: (1) remote monitoring center 210; and (2) and field detection 220. The remote monitoring center 210 can be, for example, tens of kilometers away from the event area for remote monitoring. The remote monitoring center 210 can significantly reduce the injury risk to technicians. In the proposed architecture, one optical cable 226 provides multiple functionalities such as distributed sensing and an access network. Typically, the optical cable 226 consists of multiple fiber bundle, one for communication, the others are dark fibers. In this proposed architecture, two fibers are employing, one for distributed sensing and one for access network. Wavelength Division Multiplexing (WDM) signals are generated in the remote monitoring center 210 by using a pulse laser 211 for sensing and a Distributed Feedback Laser-Laser Diode (DFB-LD) 212 for the access network.—Sensing pulses are delivered to the field through optical fiber 226A while the reflected sensing signals will be received by the receiver 215 in the remote monitoring center 210 via a circulator 214. For event detection in the field, optical fiber is laid on road fences 221 for long-term, continuous rock falling detection. Additionally, the optical fiber can also be laid along the road 222 for road condition detection. For event detection, falling rocks, mudslides, and so forth are the sensing sources which can be received via optical fiber laid on road fences 221 with DAS/DVS technologies for acoustic and vibration detection. To monitor road condition, every driving car can be a sensing source. The sensing signals can be detected by road cable 222 with a DVS and/or DAS technique. Employing novel digital signal processing (DSP) schemes in control center 216, all the sensing data is collected and analyzed to obtain the patterns of events such as the frequency of rocks falling, the size of the event and the locations at which the events occur. Even potholes and other road conditions can be detected, for example, acoustically using a DAS technique. Artificial learning can be used to distinguish between different events and not detect changes in events (e.g., pothole is getting bigger, based on the louder sounds cars make when they go into the pothole). After training by self-learning, the size of the rocks involved in falling event can be used to distinguish normal or small/trivial events from emergency situations. Composite cable 226 can be used in the field, which includes optical fiber 226A, 226A' and power cable 226B to respectively provide sensing information, networking services and power to the display sign 223 and base station 224. For multiple base stations 224, the broadcasting signal is filtered out by one fiber grating 225 to provide access networks. Additionally, the optical fiber 226A' can connect to the base station 224 directly if only one station is existed. An Acoustic-Optic Modulator (AOM) 261 and Modulator (MOD) 262 and drivers 263 and 264 are used for the pulse laser 211 and the DFB-LD 212.

A description will now be given regarding an exemplary scenario to which the present invention can be applied. The description will be followed by a corresponding high-level block diagram further describing the scenario in terms of a flow chart with respect to FIG. 3.

Based on locations of the cable and frequencies of the signals, sensing data can be used for event detection and road condition monitoring. In a normal situation (e.g., no event, good road condition), the base station will provide regular positioning navigation and access network services to users. In the case of a small event or bad road condition, a display sign will be activated, e.g., from a center or other location, for early warning. The base station will broadcast emergency information to all users responsive to the emergency event being detected. In an embodiment, for users close to the event, the base station can push notification messages to reduce the injury risk by early warning. In an embodiment, for users far from the event, the base station can broadcast emergency information to enable the users to timely choose different routes to avoid the risk.

Figure 3:
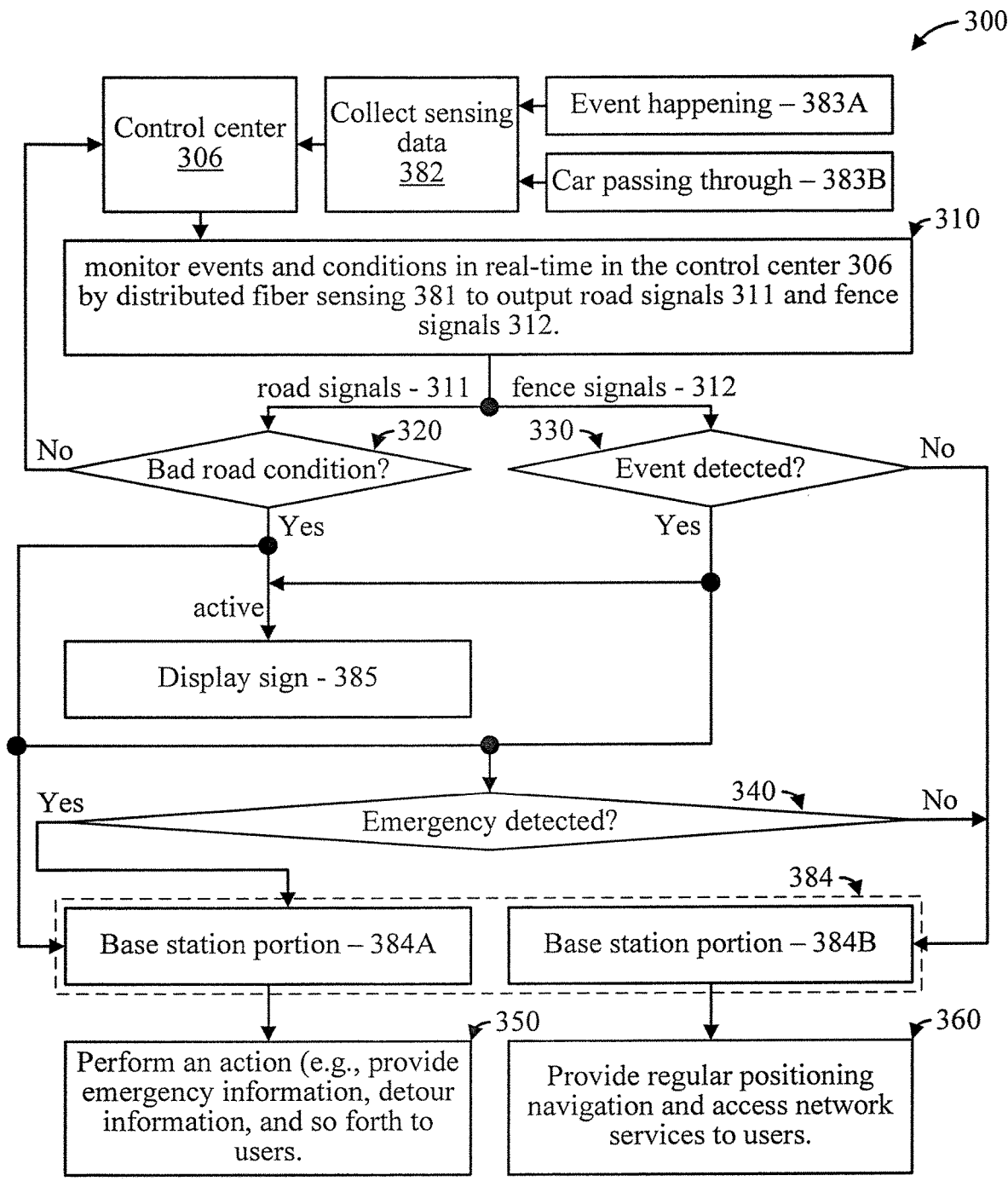
FIG. 3 is a high-level block diagram showing an exemplary method for fiber sensing on roadside applications, in accordance with an embodiment of the present invention.

FIG. 3 is a high-level block diagram showing an exemplary method 300 for fiber sensing on roadside applications, in accordance with an embodiment of the present invention.

At block 310, monitor events and conditions in real-time in the control center 306 by distributed fiber sensing 381 to output road signals 311 and fence signals 312. Hereinafter, the terms "events" and "conditions" can be collectively referred to as "events".

The distributed fiber sensing 381 can involve collecting sensing data 382 from events such as an event happening 383A and a car passing (e.g., through a tunnel) 383B.

At block 320, determine whether a bad road condition exists. If so, then send a signal to the base station 384 to proceed to block 350, also send an "active" signal to the display sign 385 in order to activate the sign, and proceed to block 340. Otherwise, return to block 320.

At block 330, determine whether an event is detected. If so, then proceed to block 340 and also send an "active" signal to the display sign 385 in order to activate the sign. Otherwise, then send a signal to the base station portion 384B to proceed to block 360.

At block 340, determine whether an emergency has been detected. If so, then send a signal to the base station portion 384A to proceed to block 350.

At block 350, provide emergency information to users. The information can include, for example, but is not limited to, when the bad road condition or emergency occurred, where the bad road condition or emergency occurred, the type of bad road condition, the type of emergency, and so forth. In an embodiment, the users close to the event (e.g., within a threshold distance, a threshold radius, etc.) can receive push notification messages from the base station to reduce the injury risk by early warning. In an embodiment, the users whom far from the event (e.g., outside of a threshold distance, a threshold radius, etc.) would be noticed by the broadcast emergency information and, thus, be able to choose different routes to avoid the risk.

In an embodiment, block 350 can involve performing an action responsive to the detection of an emergency. The same can involve activating a detour sign with detour information to navigate around or away from the emergency. A vehicle could be directed to a safe zone until the emergency condition (rock fall, mudslide, etc.) ceases. These and other actions are readily determined by one of ordinary skill in the art given the teachings of the present invention provided herein, while maintaining the spirit of the present invention.

At block 360, provide regular positioning navigation and access network services to users.

Figure 4:
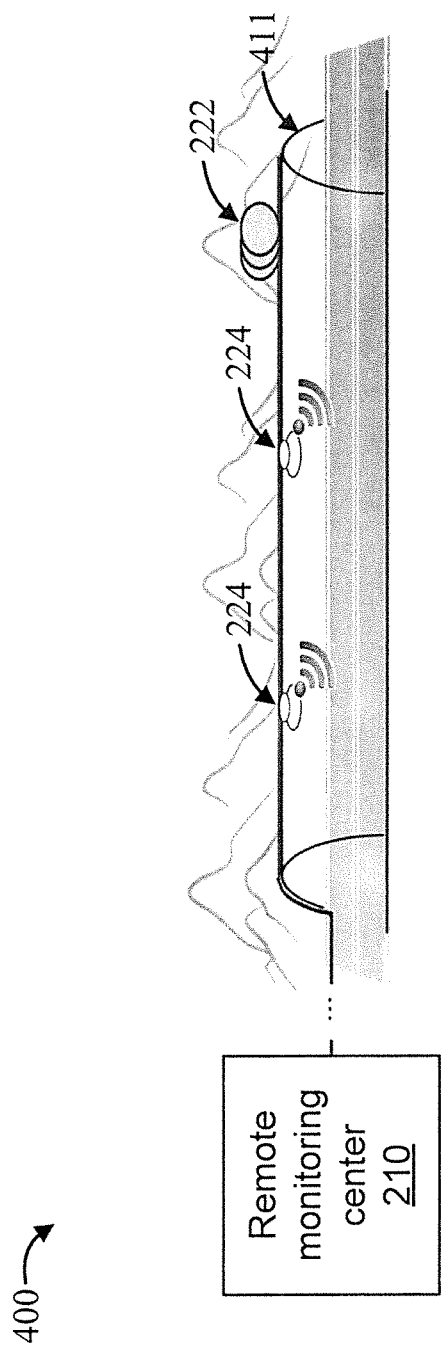
FIG. 4 is a block diagram showing an exemplary mountain cave tunnel scenario to which the present invention can be applied, in accordance with an embodiment of the present invention.
Figure 5:
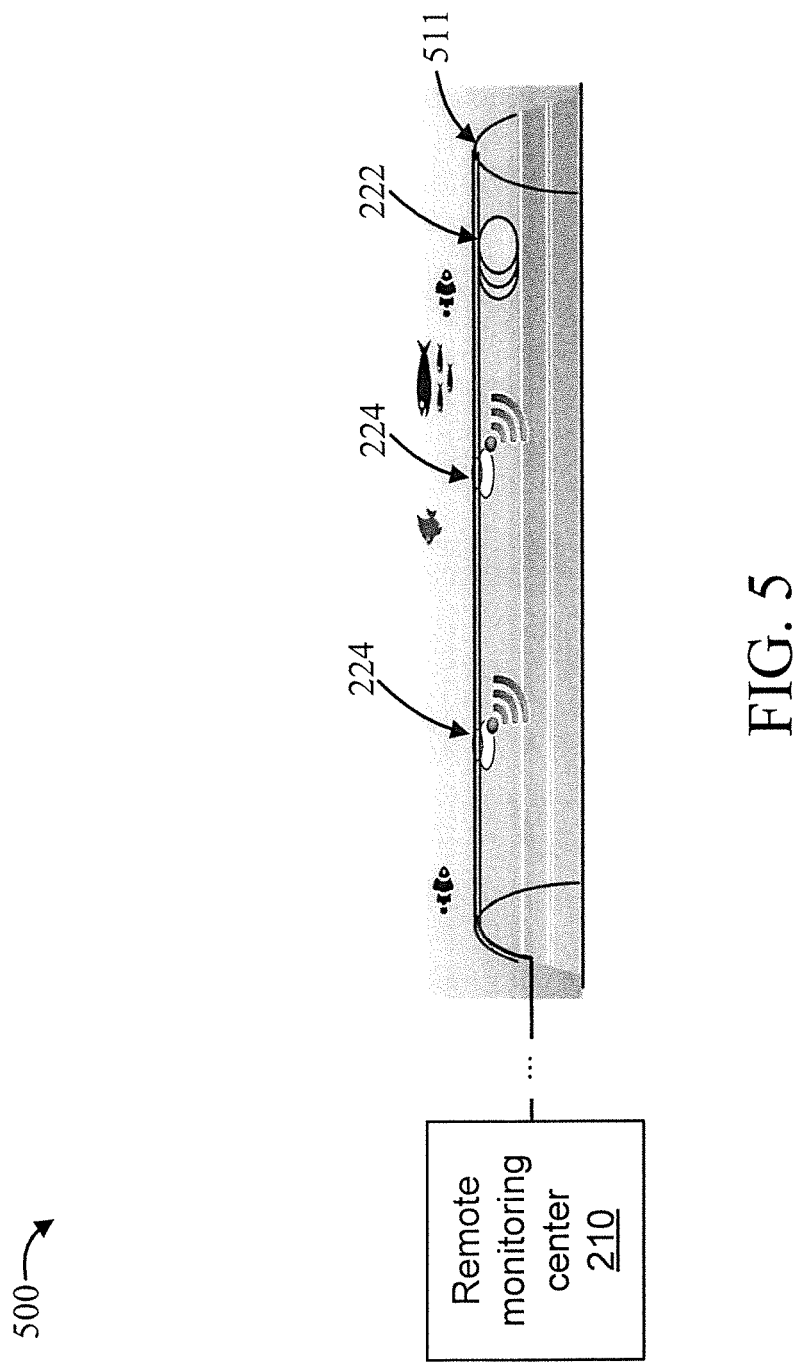
FIG. 5 is a block diagram showing an exemplary underwater tunnel scenario to which the present invention can be applied, in accordance with an embodiment of the present invention.

The proposed distributed fiber sensing integrated with communication system can be deployed on road fences including highway and railway lines (see, e.g., FIG. 4) as well as cave tunnels and undersea tunnels (see, e.g., FIG. 5).

FIG. 4 is a block diagram showing an exemplary mountain cave tunnel scenario 400 to which the present invention can be applied, in accordance with an embodiment of the present invention.

In scenario 400, distributed fiber sensing for rock falling monitoring and tunnel structure health monitoring by vibration and strain detection can be achieved using the present invention. For example, monitoring can be performed using the remote monitoring center 210 for a mountain tunnel 411 as described herein.

FIG. 5 is a block diagram showing an exemplary underwater tunnel scenario 500 to which the present invention can be applied, in accordance with an embodiment of the present invention. In FIG. 5, monitoring by the remote monitoring center 210 is performed for an underwater tunnel 511.

Distributed fiber sensing for strain and water leakage detection by the remote monitoring center 210 in accordance with the present invention will reduce the risk of tunnel damages. The optical fiber communication system can provide access network services inside tunnels without any shielding effects.

A further description will now be given regarding the remote monitoring center 110, in accordance with an embodiment of the present invention.

The remote monitoring center 210 is connected to WDM channels for sensing and communication services over the same optical fiber cable.

The control center 106 can perform one or more of the following functions: (1) analyzing sensing data from fiber sensor; (2) auto training the system to study the patterns (i.e., rock falling frequency, road conditions, etc.) that form events; (3) automatic judgement for the severity of events; (4) automatic activation of one or more display signs for early warning; and (5) push messages from a base station to users that are close to a detected event; and (6) broadcast messages from a base station to users that are remote from a detected event (to allow navigating around the event in a timely manner should the detected event occur in the original route to be taken by a user prior to any warning).

By the use of DVS and machine learning, results from DVS can used to detect, e.g., but not limited to, falling rocks, road structure health, tunnel strain, water leaks, and so forth. By the use of DAS and machine learning, results from DAS can be used to detect unique acoustic spectra corresponding to, for example, but not limited to, falling rocks, hazardous road conditions.

In the field, fiber on fences integrated with distributed fiber sensing can collect sensing signals from events such as, for example, but not limited to, rocks falling, mudslides, dangerous roadside conditions (e.g., potholes, debris, and so forth). Falling rocks will have a different acoustic signature than vehicle hitting potholes or debris, and the different acoustic signatures can be used to specifically identify the event.

In the field, fiber on the road integrated with distributed fiber sensing can collect signals from events such as, for example, but not limited to, a car passing, overtaken, and so forth.

In the field, a communication system can provide regular positioning navigation and network access services in the case of small or no events, can push messages to users close to events, and broadcast information to users farther from events. These and other variations in the communications provided by the present invention are readily determined by one of ordinary skill in the art given the teachings of the present invention provided herein, while maintaining the spirit of the present invention.

In the field, a composite cable can be used in order to communicate and sense via the fiber portion of the composite cable, while power can be supplied, for example, to the signs from the power portion of the composite cable. The signs can be warning signs, detour signs, and so forth. The signs are used to inform drivers of hazardous and other undesirable conditions. The signs can provide messages to drivers regarding detected events and their severity and possibly detour information if applicable.

Regarding the use of artificial intelligence, any machine learning approach can be adopted for use with the present invention, given the teachings of the present invention provided herein. For example, supervised or unsupervised learning techniques can be used. Further, information from one location can be used as a baseline or reference point for a similar location condition-wise. These and other variations are readily determined by one of ordinary skill in the art given the teachings of the present invention provided herein, while maintaining the spirit of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A road condition detection system, comprising:
   a first optical fiber laid by a road;
   a second optical fiber laid along a fence adjacent to the road;
   a receiver configured to receive backscattered light including a pattern indicating a state of the road from the first optical fiber, and configured to receive backscattered light including a pattern indicating a state of the fence adjacent to the road from a second optical fiber positioned along and upon the fence; and
   an analyzer configured to analyze a road condition by comparing the pattern indicating the state of the road with a trained model learned by the analyzer, and configured to analyze a fence condition by comparing the pattern indicating the state of the fence with a trained model learned by the analyzer,
   wherein the analyzer detects a road hazard and a fence condition based on a result of the comparisons, and determines, based on the detection of a road hazard and/or a fence condition to display emergency information to a road sign and/or wirelessly via a base station, and based upon that determination, subsequently displays on the road sign, and/or notifies users of emergency information via a base station when the road hazard and/or fence condition is detected;
   wherein display and notification procedures for detected/determined road hazard and fence conditions are not the same; and
   wherein the first optical fiber laid by the road and the second optical fiber laid along the fence are part of a composite cable that in addition to simultaneously conveying optical signals, the composite cable includes communications cable and electrical power cables for the road sign and base station.

2. The road condition detection system according to claim 1, wherein the analyzer detects the road condition based on a comparison of a vibration pattern indicating the state of the road included in the backscattered light and the trained model and detects fence conditions based on a comparison of a vibration pattern indicating the state of the fence included in the backscattered light and the trained model.

3. The road condition detection system according to claim 1, wherein the analyzer detects the road condition based on a comparison of an acoustic pattern indicating the state of the road included in the backscattered light and the trained model and detects fence conditions based on a comparison of a vibration pattern indicating the state of the fence included in the backscattered light and the second trained model.

4. The road condition detection system according to claim 1, wherein the analyzer detects at least one of falling rocks, mudslides, road structure health, tunnel strain, and water leaks as a road hazard.

5. A method of detecting road condition, comprising:
   receiving backscattered light including a pattern indicating a state of a road from a first optical fiber;
   receiving backscattered light including a pattern indicating a state of a fence located along the road from a second optical fiber positioned along and upon the fence;
   analyzing the pattern indicating the state of the road in a comparison relating to a trained model learned by an analyzer; analyzing the pattern indicating the state of the fence in a comparison relating to a trained model learned by the analyzer; and detecting a road condition hazard and a fence condition based on a result of the comparisons; and
   based on any detected road condition hazard and any fence condition, displaying emergency information to a road sign and notifying users of emergency information wirelessly via a base station when the road hazard is detected or fence condition is detected;
   wherein the displaying of emergency information and notification of emergency information wirelessly via the base station is different for road hazard and fence condition determinations; and
   wherein the first optical fiber and the second optical fiber are part of a composite cable that in addition to simultaneously conveying optical signals, the composite cable includes communications cable and electrical power cables for the road sign and base station.

6. The method of detecting road condition according to claim 5, wherein said analyzing comprises comparing a vibration pattern indicating the state of the road with the trained model and detects fence conditions based on a comparison of a vibration pattern indicating the state of the fence included in the backscattered light and the trained model.

7. The method of detecting road condition according to claim 5, wherein said analyzing step comprises comparing an acoustic pattern indicating the state of the road with the trained model and detects fence conditions based on a comparison of a vibration pattern indicating the state of the fence included in the backscattered light and the second trained model.

8. The method of detecting road condition according to claim 5, wherein the detecting comprises detecting at least one of falling rocks, mudslides, road structure health, tunnel strain, and water leaks as a road hazard.

9. The system of claim 1 wherein the notification to users of the emergency information made via the base station is a wireless push notification.

10. The method of claim 5 wherein the notification to users of the emergency information made via the base station is a wireless push notification.

* * * * *